July 31, 1934.  H. H. INNIS  1,968,556

COMPASS

Filed May 4, 1931

Inventor
Harry H. Innis,
by Charles V. Mullan
His Attorney.

Patented July 31, 1934

1,968,556

UNITED STATES PATENT OFFICE 1,968,556

COMPASS

Harry H. Innis, Munhall, Pa., assignor to General Electric Company, a corporation of New York Application May 4, 1931, Serial No. 534,866

6 Claims. (Cl. 33—225)

This invention relates to compasses, more particularly to compasses employed upon moving bodies such, for example, as ships and aircraft, and it has for an object the provision of a simple, reliable and improved device of the kind for compensating for the errors introduced into the indication of a compass due to the presence of permanently magnetized bodies in the vicinity of the compass.

Regardless of the direction of a magnetic force, its horizontal component may be resolved into two components at right angles with each other, the disturbing effect of which upon the indication of a compass may be compensated, i. e., reduced to zero by means of auxiliary magnetic forces respectively equal to and in opposite directions to these components of the disturbing force. Accordingly, a further object of the invention is the provision of a simple and reliable compensating device that will at all times provide for the introduction of compensating component magnetic forces exactly at right angles to each other.

In illustrating this invention in one form thereof I have shown it as embodied in a compass structure particularly adapted for use upon aircraft. It will be understood, however, that the invention is not limited in its application to aircraft compasses but is generally applicable to other types of compasses such, for example, as the well-known mariner's compass.

In one aspect my invention comprises a pair of auxiliary magnetic members situated in cooperative relationship with the direction sensitive element of a compass, together with means for mounting these magnetic members so that they may be rotated in a common substantially vertical plane.

More specifically, in carrying my invention into effect in one form thereof I provide a pair of compensating units mounted at right angles with each other and each comprising a pair of magnetic members situated in cooperative relationship with the direction sensitive element of the compass together with means for mounting these magnetic members so that they may be rotated in vertical planes for the purpose of introducing compensating component forces at right angles to each other and of the desired magnitude.

Figure 1:
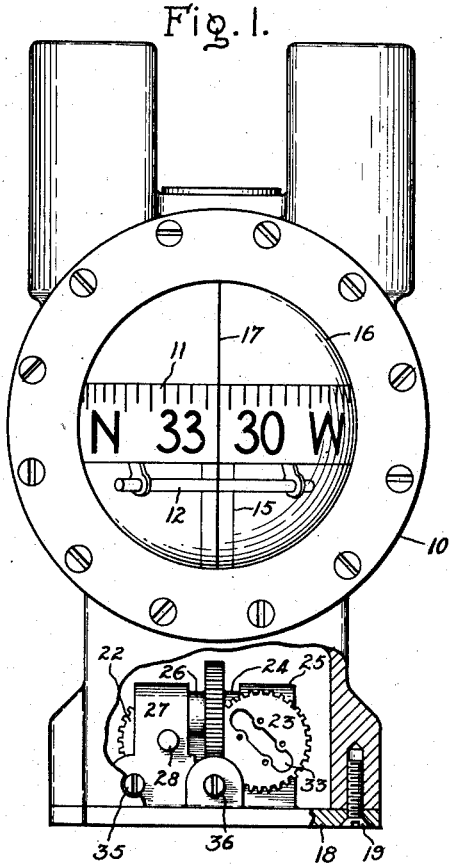
Figure 2:
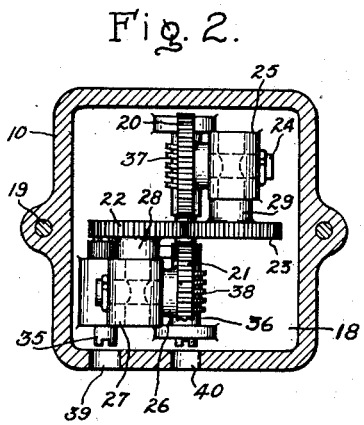
Figure 3:
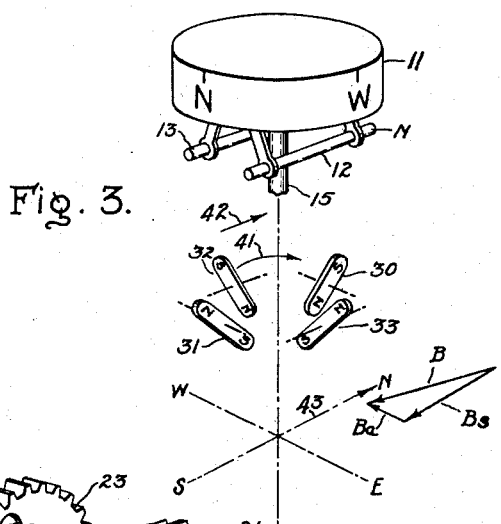
Figure 4:
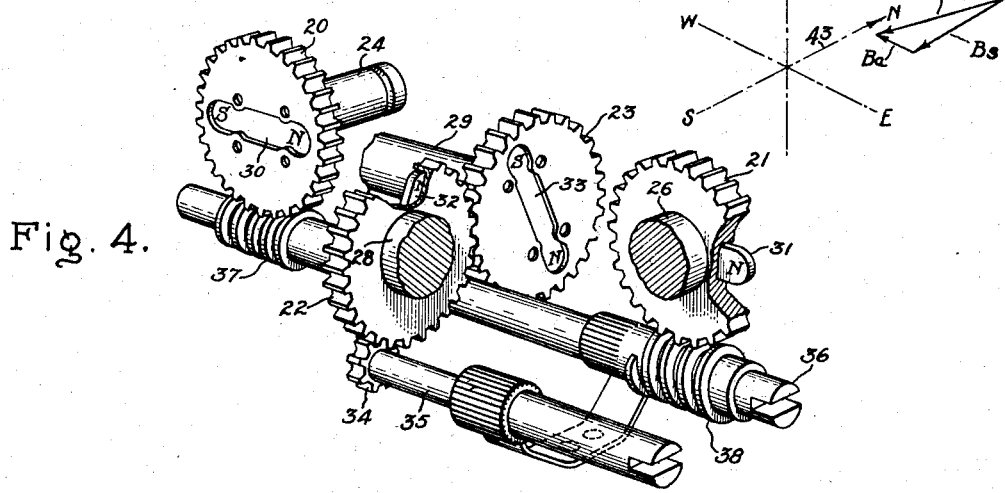

For a more complete understanding of the invention reference should now be had to the following specification and to the accompanying drawing in which Fig. 1 is a view in elevation of an aircraft compass with a portion of the housing broken away to reveal the compensating mechanism comprising an embodiment of my invention; Fig. 2 is a plan view of the compensating mechanism removed from the compass; Fig. 3 is a diagrammatic view of the elements of the invention illustrating the manner of operation; and Fig. 4 is an enlarged view in perspective of the elements of the compensating device comprising an embodiment of the invention.

Referring now to the drawing the upper part of the housing member 10 is shaped in the form of a bowl to provide a chamber within which is mounted the direction sensitive element of the compass, i. e., the card 11 and the card magnets 12 and 13 which are suspended therefrom by any suitable supporting means such for example as the stirrups illustrated in the drawing. A central vertical post 15 which is provided at its upper end with a suitable jewelled bearing (not shown) serves to support the card 11 in a substantially horizontal position and to provide for rotation of the card about a vertical axis defined by the central axis of the post 15.

The chamber defined by the housing member 10 is filled with a suitable damping liquid such for example as kerosene or alcohol and is provided with a window 16 through which the cardinal characters of the card may be viewed by the observer. As shown, the window 16 is provided with a stationary reference mark, familiarly known as a lubber line. The character upon the card 11 with which the lubber line appears to coincide indicates the direction in which the body is pointed as would be determined by a transit or other suitable means.

The lower part of the housing 10, i. e., the portion situated beneath the bowl, is formed to provide a chamber within which the compensating mechanism is placed. As shown, the compensating mechanism comprises a base member 18 which is made of any suitable non-magnetic material such for example as brass or aluminum and upon which the elements of the mechanism are secured as illustrated in Figs. 1 and 2. The compensating mechanism is removably secured to the lower part of the housing 10 by any suitable means, such for example as the screws 19, for the purpose of facilitating the removal for the purpose of repair or replacement.

As shown in the drawing, the compensating mechanism comprises two units mounted at right angles with each other. One of these compensating units consists of the gear wheels 20 and 21 whilst the unit at right angles thereto comprises the gear wheels 22 and 23. The gear wheel 20 is secured to a stub shaft 24 which is journaled for rotation in a boss 25 which is integral with the base plate 18 and which projects upwardly therefrom as shown in Figs. 1 and 2. Similarly the gear wheel 21 is mounted upon a stub shaft 26 which is journaled in the upwardly projecting boss 27. In like manner the gear wheels 22 and 23 are respectively secured to stub shafts 28 and 29 which in turn are respectively journaled in upright bosses 27 and 25. It will thus be clear that the gear wheels 20, 21, 22, and 23 all rotate in vertical planes; and that gear wheels 20, 21 rotate in a common vertical plane which intersects the common vertical plane of rotation of the gear wheels 22 and 23 substantially at right angles. The line of intersection of these two planes coincides with the center line of post 15.

As shown in Figs. 1 and 4 the gear wheels 20, 21, 22, and 23 are each cut away on one face thereof to provide diametrically disposed slots in which are respectively mounted the permanent magnets 30, 31, 32, and 33. The gear wheels themselves are made of any suitable non-magnetic material such, for example, as brass so that they will not be influenced by magnetism and consequently will not introduce any undesired magnetic effects in the operation of the compensating mechanism. It will be observed that the gear wheels 20 and 21 are so placed initially that the compensating magnets 30 and 31 which they respectively carry are in alignment and that the poles of unlike polarity of the compensating magnets 30 and 31 are adjacent each other; i. e., as shown the north seeking pole of the magnet 30 is adjacent the south seeking pole of the magnet 31. Similarly the gear wheels 22 and 23 are initially so mounted that the magnetic axis of the compensating magnets 32 and 33 are in alignment and poles of these magnets of unlike polarity are adjacent each other.

The gear wheels 22 and 23 which engage each other may be rotated in opposite directions as shown by any suitable means such, for example, as a small spur driving gear 34 mounted upon a shaft 35 having its opposite end provided with a slot so that it may be rotated by means of a screw driver.

The gear wheels 20 and 21 are also rotated in opposite directions by any suitable driving means such for example as the worm shaft 36 which is provided with opposite handed worms 37 and 38; the worm 37 engaging the gear wheel 20 and the worm 38 engaging the gear wheel 21. It will be observed that by employing a worm drive between the shaft 36 and the gear wheels 20 and 21 and the spur gear drive between the shaft 35 and the gear wheels 22 and 23 that the shafts 35 and 36 are parallel with each other although the pairs of gears which are driven thereby are at right angles with each other. This feature is desirable from the point of view of ease in adjustment since access may be had to both shafts through the front side of the housing as shown in Fig. 2, wherein the front wall of the housing is shown provided with small circular openings 39 and 40 through which a screw driver may be inserted for the purpose of effecting rotation of the shafts 35 and 36.

The compass together with its compensating mechanism is installed upon a craft such for example as an airplane in such a manner that the plane of rotation of the compensating magnets 30 and 31 is parallel to the fore and aft axis of the craft, the plane of rotation of the compensating magnets 22 and 23 is accurately athwartship; whilst the intersection of these planes coincides with the vertical axis of the post 15 about which the card 11 and the card magnets 12 and 13 rotate. It will be observed that the compensating magnets of each pair are symmetrically situated on opposite sides of this vertical axis and consequently are symmetrically disposed with respect to the poles of the card magnet so that the influence of the compensating magnets is exactly the same on both poles of the card magnets which feature is important from the point of view of effecting accurate and complete compensation of the compass for all positions of the craft upon which it is mounted.

As thus arranged the pair of magnets 32, 33 produce an auxiliary component magnetic field, the direction of which in the vicinity of the card magnets 12, 13 is parallel to the fore and aft axis of the craft, whilst the pair of magnets 30, 31 produce an auxiliary magnetic field in the vicinity of the card magnets which is accurately athwartship, as indicated by the arrows 41, 42 in Fig. 3. When the magnets 32, 33 are in the position in which they are shown in Fig. 3 the influence, i. e., the turning moments, which they exert upon the card magnets is a maximum. The strength of this influence or turning moment may be varied from a maximum in the direction indicated by the arrow 41, when the magnets 32, 33 are in the position shown in Fig. 3, to a maximum in exactly the opposite direction when these magnets are both rotated in opposite directions through 180° so that the south and north poles of the magnets 32 and 33 respectively will occupy the positions which the north and south poles of these magnets are shown as occupying in Fig. 3. Likewise the strength of the turning moment of the magnets 30 and 31 upon the card magnet may be varied from a maximum in the direction indicated by the arrow 42 when these magnets are in the positions shown in Fig. 3 to a maximum in exactly the opposite direction by rotating these magnets through 180° so that the north and south poles of the magnets 30, 31 will occupy the position which the south and north poles of these magnets are respectively shown as occupying in Fig. 3.

Persons skilled in the art will understand that when the magnets 30, 31 are in the position indicated in Fig. 3 their effect or influence upon the card magnets is similar to the differential effects of two magnets; one having a length equal to the distance between the south and north poles of the magnets 30, 31 respectively and situated near the card and the other, a short magnet equal in length to the distance between the north and south poles of the magnets 30, 31 respectively and situated at a greater distance from the card. Since rotation of the magnets 30, 31 in opposite directions alters the distance between the poles of these compensating magnets as well as the distance between the poles of these magnets and the card magnets 12, 13, the effects produced upon the card magnets by such rotation of the compensating magnets is the same as the effect that would be produced by a magnet of varying strength and varying distance from the card magnets.

With the above understanding of the invention both as to the structure and organization of the elements and the manner in which compensating component magnetic fields of varying strength at right angles to each other may be produced, the manner in which the device functions to compensate for the effect of a stray magnetic field upon the reading of the compass will readily be understood. In adjusting the compensating mechanism, the craft is headed, by means of a transit or otherwise, so that its fore and aft axis is exactly parallel to the north-south meridian of the earth's magnetic field which is represented by the vector 43 in Fig. 3. The presence of a stray magnetic field, such for example as might be caused by the engine or some other magnetic part of the plane becoming magnetized will exert a turning moment upon the card magnets of the compass so that the compass card 11 will not give the indication that it would otherwise give in the absence of a disturbing magnetic field. Assuming that this disturbing magnetic field is of such magnitude and direction that its horizontal component is represented by the vector B in Fig. 3, this horizontal component of the disturbing field may itself be resolved into two components at right angles with each other. A component $B_s$ parallel to the direction of the earth's magnetic field and also to the fore and aft axis of the craft and a component $B_a$ at right angles to the direction of the earth's magnetic field and lying exactly athwartship. Since the fore and aft axis of the craft is headed north and south the component $B_s$ exerts no influence, i. e., turning moment, upon the card magnets 12 and 13 since as pointed out above its component is parallel to the direction of the earth's magnetic field. The component $B_a$, however, which is at right angles to the direction of the earth's field will cause the card magnets 12, 13 to be deflected from the true north-south position which they would otherwise normally occupy in the earth's field so that the indication of the card 11 will be erroneous. This erroneous indication may be corrected by rotating the shaft 35 so as to rotate the gear wheels 22, 23 and the compensating magnets 32, 33 carried thereby until a compensating component magnetic field exactly equal to and opposite in direction to the component $B_a$ is produced by these magnets. When the component $B_a$ is completely balanced out the card magnets 12, 13 will return to their normal position in the earth's magnetic field and the card will read true north.

In order to effect the athwartship compensation, a craft is headed east and west by means of a transit or otherwise. The component $B_s$ of the stray magnetism which was formerly parallel to the direction of the earth's field will now be at right angles thereto and consequently it will exert an influence or turning moment upon the card magnets 12, 13 such as to deflect them from the position that they would ordinarily occupy in the earth's field, with the result that the card will not indicate true east or west as the case may be. The effect of the component $B_s$ may be balanced out, however, by turning the shaft 36 and the gear wheels 20, 21 and the compensating magnets carried thereby until an auxiliary component field exactly equal to and in the opposite direction to that of the component $B_s$ is produced. When the component $B_s$ is completely balanced out by the auxiliary field produced by the magnets 30, 31 the card magnets 12, 13 will return to their normal undeflected position in the earth's magnetic field and the card 11 will indicate east or west as the case may be.

It will thus be seen that I have provided a compensating device for a compass in which the compensating component magnetic fields produced by its several units are always at right angles with each other and furthermore, that these auxiliary compensating magnetic fields will remain at right angles with each other despite wear of the gear wheels 20, 21, 22 and 23 or variation in the strength of the compensating magnets 30, 31, 32 and 33.

Although in accordance with the provisions of the patent statutes I have described this invention in concrete form, I would have it understood that the invention is not limited to the exact structure described and shown since alterations and modifications will readily suggest themselves to persons skilled in the art without departing from the true spirit of this invention or from the scope of the annexed claims.

What I claim as new and desire to secure by Letters Patent of the United States is:

1. A compensating device for compasses and the like comprising a pair of magnets, means for mounting said magnets with poles of unlike polarity adjacent each other for rotation in a substantially vertical plane, means for simultaneously rotating said magnets in opposite directions, a second pair of magnets, means mounting said second pair of magnets with poles of unlike polarity adjacent each other for rotation in a substantially vertical plane intersecting said first mentioned plane and means for simultaneously rotating said second pair of magnets in opposite directions.

2. A compass compensating device comprising a pair of magnets arranged with poles of unlike polarity adjacent each other, mounting means providing separate axes of rotation for said magnets, and means for simultaneously rotating said magnets in opposite directions.

3. A compass compensating device comprising a pair of magnets arranged with the poles of one magnet adjacent the poles of unlike polarity of the other magnet, means for mounting said magnets for rotation in a common plane about separate axes, and means for simultaneously rotating said magnets in opopsite directions.

4. A compass compensating unit comprising a pair of magnets arranged with a pole of one magnet adjacent a pole of opposite polarity of the other of said magnets, mounting means providing for rotation of said magnets in a substantially vertical plane, and means for simultaneously rotating said magnets in opposite directions.

5. A compass compensating device comprising a unit having a pair of magnets arranged with unlike poles adjacent each other, means mounting said magnets for rotation in a vertical plane, means for rotating said magnets in opopsite directions, and a second unit comprising a pair of magnets arranged with unlike poles adjacent each other, means mounting said magnets for rotation in a second vertical plane intersecting said first mentioned plane, and means for rotating the magnets of said second unit in opposite directions.

6. A compass compensating mechanism comprising a unit having a pair of magnets arranged with the poles of one of said magnets adjacent the poles of opposite polarity of the other of said magnets and means mounting said magnets for individual rotation in a substantially vertical plane, a second unit comprising a pair of magnets arranged with the poles of one of said magnets adjacent the poles of opposite polarity of the other of said magnets and means mounting the magnets of said second unit for individual rotation in a substantially vertical plane intersecting said first mentioned plane at substantially right angles, the magnets of each of said pairs being located on opposite sides of the intersection of said planes.

HARRY H. INNIS.